United States Patent
Fujita et al.

(10) Patent No.: US 8,363,565 B2
(45) Date of Patent: Jan. 29, 2013

(54) ROUTING METHOD AND NODE

(75) Inventors: Norihito Fujita, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 12/808,388

(22) PCT Filed: Dec. 17, 2008

(86) PCT No.: PCT/JP2008/072952
§ 371 (c)(1),
(2), (4) Date: Jun. 16, 2010

(87) PCT Pub. No.: WO2009/078427
PCT Pub. Date: Jun. 25, 2009

(65) Prior Publication Data
US 2010/0265951 A1  Oct. 21, 2010

(30) Foreign Application Priority Data
Dec. 17, 2007  (JP) ................................ 2007-324563

(51) Int. Cl.
*H04L 12/56* (2006.01)
(52) U.S. Cl. ......... 370/252; 370/401; 370/428; 709/220
(58) Field of Classification Search .................. None
See application file for complete search history.

(56) References Cited

U.S. PATENT DOCUMENTS

| | | | |
|---|---|---|---|
| 6,965,568 B1 * | 11/2005 | Larsen | 370/238 |
| 2007/0140114 A1 * | 6/2007 | Mosko | 370/229 |
| 2009/0052321 A1 * | 2/2009 | Kamath | 370/235 |
| 2009/0175171 A1 * | 7/2009 | Nikolova et al. | 370/238 |

FOREIGN PATENT DOCUMENTS

| | | |
|---|---|---|
| JP | 2006005768 A | 1/2006 |
| JP | 2006527525 A | 11/2006 |
| JP | 2007184937 A | 7/2007 |

OTHER PUBLICATIONS

John Burgess et al; MaxProp: Routing for Vehicle-Based Disruption-Tolerant Networks; IEEE, 2006.*
International Search Report for PCT/JP2008/072952 mailed Mar. 31, 2009.
A. Lindgren et al., "Probabilistic Routing in Intermittently Connected Networks", In Proceedings of The First International Workshop on Service Assurance with Partial and Intermittent Resources (SAPIR 2004), Aug. 2004, Fortaleza, Brazil.

* cited by examiner

*Primary Examiner* — Hassan Phillips
*Assistant Examiner* — Duc Duong (57) ABSTRACT

A routing protocol unit (11) of each node (1) in a delay tolerant network calculates the probability of distribution to the destination node based on the log of end-to-end paths to the destination node from the past to the present registered in a routing table (12). A DTN forward unit (13) of a source node determines a next hop node to be used to forward forwarding data, based on the calculated distribution probability of each node with respect to the destination node.

22 Claims, 6 Drawing Sheets

| DESTINATION IP ADDRESS | NEXT HOP IP ADDRESS | TYPE | RELAY NODE IP ADDRESS | METRIC | DISTRIBUTION PROBABILITY |
|---|---|---|---|---|---|
| 10. 0. 0. 2 | 10. 0. 0. 2 | 1 | — | 1 | 1.0 |
| 10. 0. 0. 7 | 10. 0. 0. 3 | 1 | — | 2 | 1.0 |
| 10. 0. 0. 16 | 10. 0. 0. 4 | 2 | 10. 0. 0. 9 | 1 | 0.6 |
| 10. 0. 0. 22 | 10. 0. 0. 3 | 2 | 10. 0. 0. 10 | 3 | 0.4 |
| 10. 0. 0. 29 | 10. 0. 0. 5 | 1 | — | 3 | 1.0 |
| 10. 0. 0. 30 | 10. 0. 0. 4 | 1 | — | 2 | 1.0 |

| DESTINATION IP ADDRESS | DISTRIBUTION PROBABILITY | CACHE FLAG | LIFETIME |
|---|---|---|---|
| 10.0.0.2 | 1.0 | 0 | — |
| 10.0.0.7 | 1.0 | 0 | — |
| 10.0.0.17 | 0.5 | 0 | — |
| 10.0.0.23 | 0.3 | 0 | — |
| 10.0.0.31 | 0.6 | 1 | 10sec |
| 10.0.0.32 | 0.2 | 1 | 15sec |

FIG. 10

ROUTING METHOD AND NODE

The present application is the National Phase of PCT/JP2008/072952, filed Dec. 17, 2008, which claims priority based on Japanese patent application No. 2007-324563 filed on Dec. 17, 2007.

TECHNICAL FIELD

The present invention relates to a communication network technique and, more particularly, to a routing technique in a delay tolerant network.

BACKGROUND ART

A delay tolerant network (DTN) having a function of temporarily storing forwarding data instead of immediately forwarding it to a next hop is a network system capable of highly reliable end-to-end distribution of data contents even when the node-to-node connection is unstable and unreliable such as in a wireless ad-hoc network or satellite network.

This DTN divides forwarding data into unit sizes called bundles, and forwards each bundle to the destination. The most significant feature of the DTN is that even when the path of a bundle to be forwarded to the destination is unknown, the DTN does not discard the bundle but stores it and waits until the next hop to be forwarded is found. Even when end-to-end paths from the source to the destination do not simultaneously exist, therefore, the above operation makes it possible to forward a bundle to an intermediate node, and resume the forward of the bundle when the paths to the destination are found after that. This effectively increases the transport factor with respect to the destinations.

Accordingly, the routing method of the DTN differs from the general IP routing that finds end-to-end paths from the source to the destination.

An example of the routing method of the DTN is described in, e.g., "Anders Lindgren, Avri Doria, Olv Schelen, 'Probabilistic Routing in Intermittently Connected Networks', In Proceedings of The First International Workshop on Service Assurance with Partial and Intermittent Resources (SAPIR 2004); August 2004, Fortaleza, Brazil". This reference explains a method called PROPHET. PROPHET performs routing based on the probability of distribution to the destination. More specifically, when node B is adjacent to node A, node A updates a distribution probability $P\_i$ with respect to node B by $$P\_i = P\_(i-1) + (1 - P\_(i-1)) \times P\_{init} \ (0 < P\_{init} < 1) \quad (1)$$

where $P\_(i-1)$ is the distribution probability of node A with respect to node B before update, and $P\_{init}$ is an initialization constant.

If a state in which nodes A and B are not adjacent to each other continues, the distribution probability is gradually decreased as it is periodically updated by a method called aging in accordance with $$P\_i = P\_(i-1) \times \gamma^k \ (0 < \gamma < 1) \quad (2)$$

where $\gamma$ is the number of times of the elapse of a unit time since nodes A and B are adjacent to each other lastly.

When a node has a bundle addressed to a certain node, the node exchanges the distribution probability $P\_i$ with respect to the destination node with adjacent nodes, and forwards the bundle to an adjacent node having the highest distribution probability. If the distribution probability of an adjacent node with respect to the destination node is lower than its own distribution probability with respect to the destination node, the node keeps holding the bundle without forwarding it to the adjacent node.

As described above, PROPHET performs routing by comparing the distribution probabilities with respect to the destination node calculated based on an adjacency log.

DISCLOSURE OF INVENTION

Problem to be Solved by Invention

The technique as described above has the problem that path selection is limited because the distribution probability is updated based on only the adjacency to the destination node.

That is, above-described PROPHET is a method that increases the distribution probability of node A with respect to node B (and the distribution probability of node B with respect to node A) when node A is adjacent to node B. The higher the adjacency frequency of nodes A and B, the higher the probability that a bundle addressed to node B (or node A) is guided to node A (or node B).

If node B is always adjacent to another node C, however, the distribution probability of node A with respect to node C does not increase even when node A is adjacent to node B (node A is not adjacent to node C). That is, the distribution probability increases by adjacency with respect to only a directly adjacent node, and does not increase with respect to other nodes existing beyond the directly adjacent node. This poses the problem that the transport factor with respect to these other nodes does not increase.

The invention has been made to solve the above-mentioned problem, and has as its exemplary object to provide a routing method and node by which the distribution probability of the node can reflect another node that is not directly adjacent to the node but exists beyond a directly adjacent node.

Means for Solving the Problem

To achieve the exemplary object as described above, a routing method according to the invention is a routing method for use in a delay tolerant network capable of distribution by temporarily storing forwarding data in an intermediate node even if there is no end-to-end reachability from a source node to a destination node, comprising a routing protocol step of causing each node of the delay tolerant network to calculate a distribution probability of the node with respect to the destination node based on a log of end-to-end paths from the node to the destination node from the past to the present registered in a routing table of the node, and a DTN forward step of causing the source node to select a next hop node to be used to forward the forwarding data from the source node to the destination node, based on the calculated distribution probability of each individual node with respect to the destination node.

Another routing method according to the invention is a routing method for use in a delay tolerant network capable of distribution by temporarily storing forwarding data in an intermediate node even if there is no end-to-end reachability from a source node to a destination node, comprising a routing protocol step of causing each node of the delay tolerant network to calculate a distribution probability of the node with respect to the destination node based on a log of end-to-end paths from the node to the destination node from the past to the present registered in a routing table of the node, and a DTN forward step of, when an arbitrary forward node in the delay tolerant network selects a next hop node to which forwarding data addressed to the destination node is to be forwarded, broadcasting a path request message from the forward node across the delay tolerant network, and selecting a next hop node to be used to forward the forwarding data from the forward node to the destination node, based on the distribution probability of each individual node with respect to the destination node notified by a path response message returned from the node in response to the path request message.

A node according to the invention is a node for use in a delay tolerant network capable of distribution by temporarily storing forwarding data in an intermediate node even if there is no end-to-end reachability from a source node to a destination node, comprising a routing protocol unit which calculates a distribution probability of the node with respect to the destination node based on a log of end-to-end paths from the node to the destination node from the past to the present registered in a routing table of the node, and a DTN forward unit which, when the node is the source node, selects a next hop node to be used to forward the forwarding data from the source node to the destination node, based on the calculated distribution probability of each individual node with respect to the destination node.

Another node according to the invention is a node for use in a delay tolerant network capable of distribution by temporarily storing forwarding data in an intermediate node even if there is no end-to-end reachability from a source node to a destination node, comprising a routing protocol unit which calculates a distribution probability of the node with respect to the destination node based on a log of end-to-end paths from the node to the destination node from the past to the present registered in a routing table of the node, and a DTN forward unit which, when selecting a next hop node to which forwarding data addressed to the destination node is to be forwarded, broadcasts a path request message from the forward node across the delay tolerant network, and selects the next hop node to be used to forward the forwarding data from the forward node to the destination node, based on the distribution probability of each individual node with respect to the destination node notified by a path response message returned from the node in response to the path request message.

Effects of Invention

In the invention, the distribution probability of a node with respect to the destination node that is not directly adjacent to but apart from the node by two hops or more can reflect the destination node. This makes it possible to greatly increase the transport factor with respect to the destination, and implement a highly reliable delay tolerant network.

BEST MODE FOR CARRYING OUT THE INVENTION

Exemplary embodiments of the present invention will be explained below with reference to the accompanying drawings.

[First Exemplary Embodiment]

First, the basic configuration of a node according to the first exemplary embodiment of the present invention will be explained below with reference to FIGS. 1 and 2.

A node 1 is an information communication terminal constructing a delay tolerant network. When the delay tolerant network is a wireless ad-hoc network as shown in FIG. 2, for example, the node 1 is a wireless terminal such as a cell phone.

Figure 2:
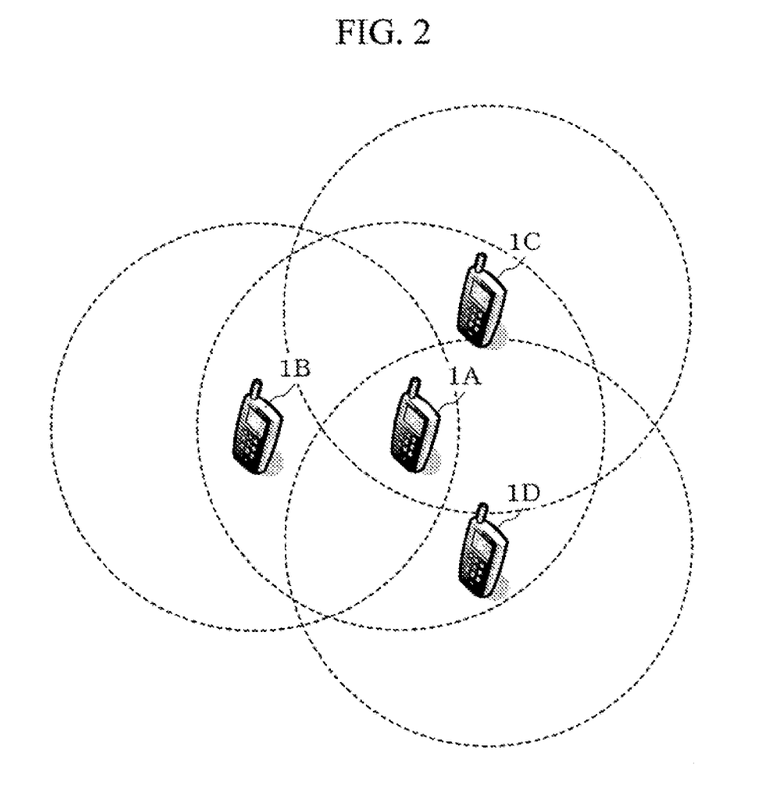
FIG. 2 shows a configuration example of a wireless ad-hoc network.

Each node 1 does not singly operate but functions as one node in the wireless ad-hoc network as shown in FIG. 2. All nodes 1A to 1D in the wireless ad-hoc network shown in FIG. 2 include the same functions as those of the node 1. A dotted-line circle centering around each of the nodes 1A to 1D indicates the range of electronic waves from the node. Nodes existing inside each circle are recognized as adjacent nodes. For example, adjacent nodes of the node 1A are the nodes 1B to 1D.

Figure 1:
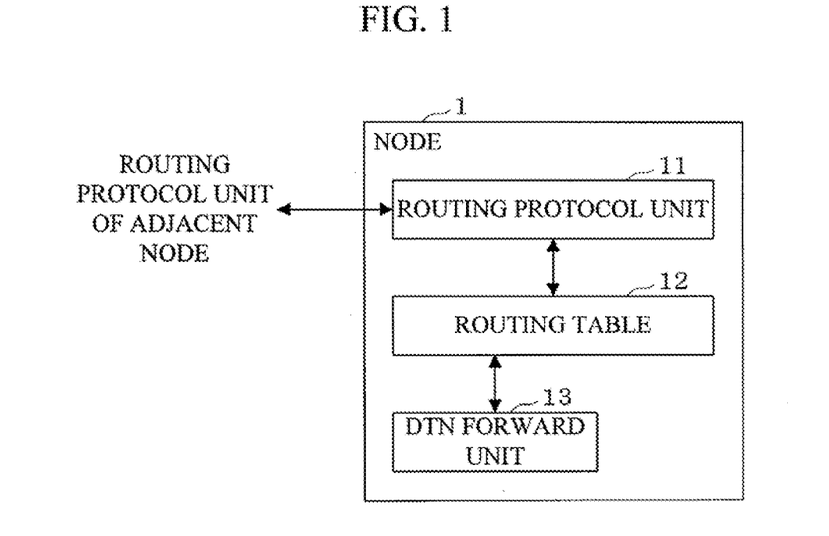
FIG. 1 is a block diagram showing the basic configuration of a node according to the first exemplary embodiment of the present invention.

As shown in FIG. 1, the node 1 includes a routing protocol unit 11, routing table 12, and DTN forward unit 13, as basic components. These basic components are implemented by the cooperation of hardware including a CPU, a memory, and various interface circuits of a general information communication terminal and software such as programs and applications.

In each node 1 in the network of this exemplary embodiment, the routing protocol unit 11 calculates the probability of distribution to the destination node based on the log of present and past end-to-end paths to the destination node registered in the routing table 12, and the DTN forward unit 13 determines the next hop node to be used to forward forwarding data, based on the distribution probability of each node 1 with respect to the destination node.

Details of the arrangement of the node 1 will be explained below with reference to FIG. 3.

Figure 3:
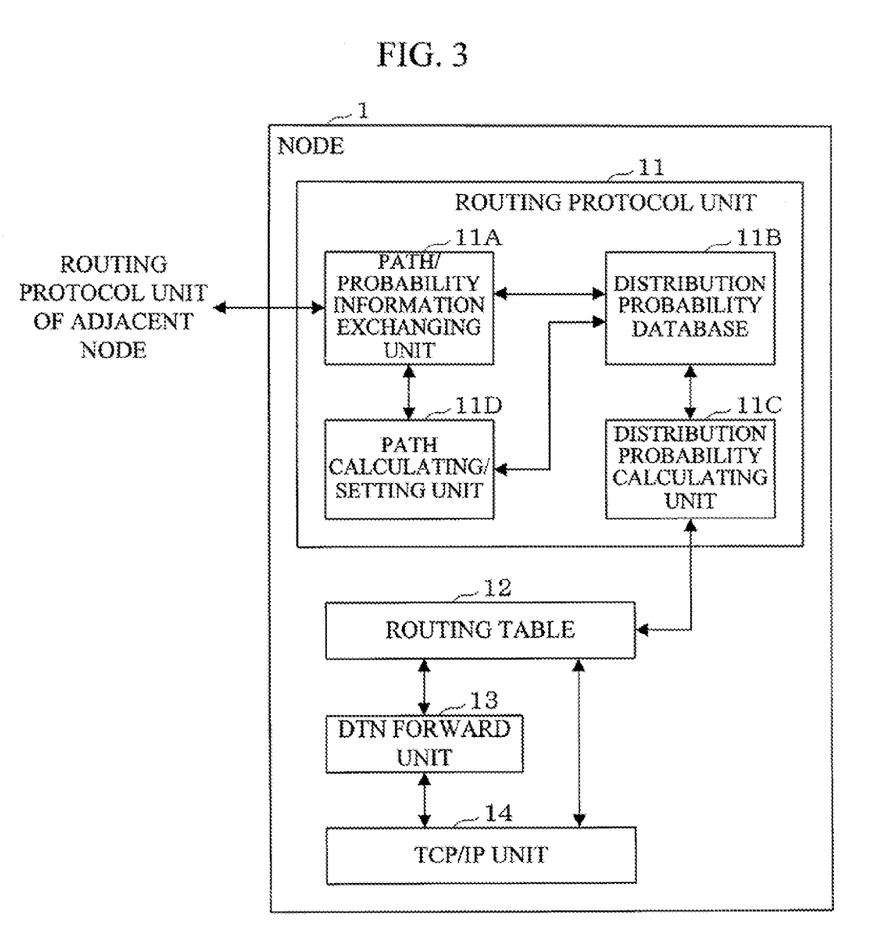
FIG. 3 is a block diagram showing the arrangement of the node according to the first exemplary embodiment of the present invention.

Referring to FIG. 3, the node 1 includes the routing protocol unit 11, the routing table 12, the DTN forward unit 13, and a TCP/IP unit 14, as main functional units. These functional units are implemented by the cooperation of hardware including a CPU, a memory, and various interface circuits of a general information communication terminal and software such as programs and applications.

The routing protocol unit 11 includes a path/probability information exchanging unit 11A, distribution probability database 11B, distribution probability calculating unit 11C, and path calculating/setting unit 11D, as main processing units.

The path/probability information exchanging unit 11A has a function of exchanging node information, link information, distribution probability information, and the like with an adjacent node, forming a routing entry based on the exchanged information, and updating the routing table 12 by the formed routing entry.

The distribution probability database 11B is a database storing the information of the distribution probability with respect to each node in the network.

The distribution probability herein mentioned is a numerical value indicating the capability of each node with which the node distributes a bundle to the destination node. For example, when a certain node has a distribution probability of 1.0 with respect to the destination node, the node has a path (to be referred to as a direct path hereinafter) directly connected to the destination node. Also, when a certain node has a distribution probability of 0 with respect to the destination node, the possibility that the node distributes a bundle to the destination node is zero or unknown, such as when the node does not know the destination node at all.

On the other hand, when a certain node has a distribution probability of 0 to 1.0 with respect to the destination node, the node had a direct path to the destination node but presently has no direct path. The distribution probability is calculated based on the time elapsed from the time at which there was a direct path to the destination node lastly, and the number of hops until the destination node along the path.

Figure 4:
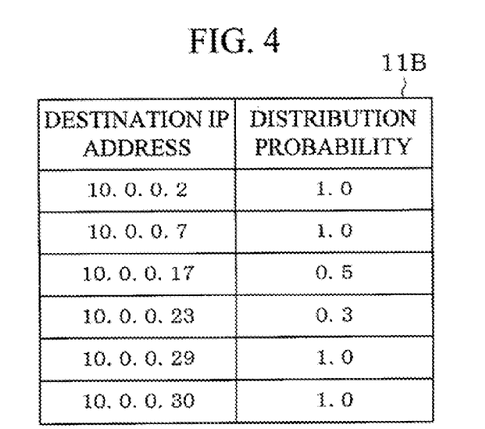
FIG. 4 shows a configuration example of a distribution probability database.

Referring to a configuration example of the distribution probability database 11B shown in FIG. 4, the IP address of each node in the network and the distribution probability with respect to the node are registered. For example, the distribution probability is 1.0 for a node having an IP address 10.0.0.2, and 0.5 for a node having an IP address 10.0.0.17.

The distribution probability calculating unit 11C has a function of calculating the probability of distribution to each destination node based on the path information stored in the routing table 12, i.e., the log of the end-to-end paths from the corresponding node to the destination node from the past to the present time, i.e., the time of distribution probability calculation, and registering the calculated distribution probability in the distribution probability database 11B.

As described in the explanation of the distribution probability database 11B, the distribution probability is calculated based on whether there is a direct path to the destination node (the distribution probability is 1.0 when there is a direct path), and, if there is no direct path to the destination node, based on the time elapsed from the time at which there was a direct path to the destination node lastly, and the number of hops until the destination node along the direct path.

An example of the calculation algorithm is as follows. Letting t be the time elapsed from the time at which there was a direct path from node $\underline{a}$ to node $\underline{b}$ lastly, and d be the number of hops from node $\underline{a}$ to node $\underline{b}$ along the direct path, a distribution probability $\overline{P}(\underline{a},\underline{b})$ of node $\underline{a}$ with respect to node $\underline{b}$ is calculated by $$P(a,b) = P(a,b) \text{old} \times \gamma\hat{\,} t \times r\hat{\,}(d-1) \quad (3)$$

where P(a,b)old is the value of P(a,b) before the calculation, γ is an attenuation constant for the time, and r is an attenuation constant for the number of hops. It is also possible to use a metric as the total sum of link costs, instead of the number of hops. Parameters other than t and d described above may also be used in the distribution probability calculation. For example, it is possible to use the distance between nodes $\underline{a}$ and $\underline{b}$ if their positions can be obtained by GPS.

The path calculating/setting unit 11D has a function of calculating a direct path to each node in the network based on intra-network node information and link information received from other nodes via the path/probability information exchanging unit 11A, and registering a path entry obtained from the calculation result in the routing table 12.

Examples of the protocol used to calculate a direct path to each node in the path calculating/setting unit 11D are OLSR (Optimized Link State Routing Protocol) and AODV (Ad Hoc On Demand Distance Vector Algorithm) used as MANET (Mobile Ad-hoc NETwork) routing protocols. This exemplary embodiment will be explained by assuming that AODV is used as the protocol of the path calculating/setting unit 11D.

Like the conventional routing protocol, the path calculating/setting unit 11D registers a direct path to a node directly connected by end-to-end. In addition, the path calculating/setting unit 11D is characterized by registering, in the routing table 12, a path to an intermediate relay node probably capable of distributing a bundle to the destination node, as a probabilistic path to the destination node. More specifically, in a state in which there is no end-to-end path at present, but if a bundle is forwarded to a certain relay node, the bundle is forwarded to the destination node by DTN forward with probability higher than that of the source node, the path to the relay node is registered as a probabilistic path to the destination node.

When setting a probabilistic path, a node having the highest distribution probability with respect to the destination node is selected from nodes having direct paths from the source node. A message of the MANET routing protocol is used as a method of detecting the probability of distribution to the destination node from each node having a direct path from the source node. The operation will be described in detail later with reference to FIG. 7.

The routing table 12 is a table registering a direct path and probabilistic path with respect to each node in the network.

Figure 5:
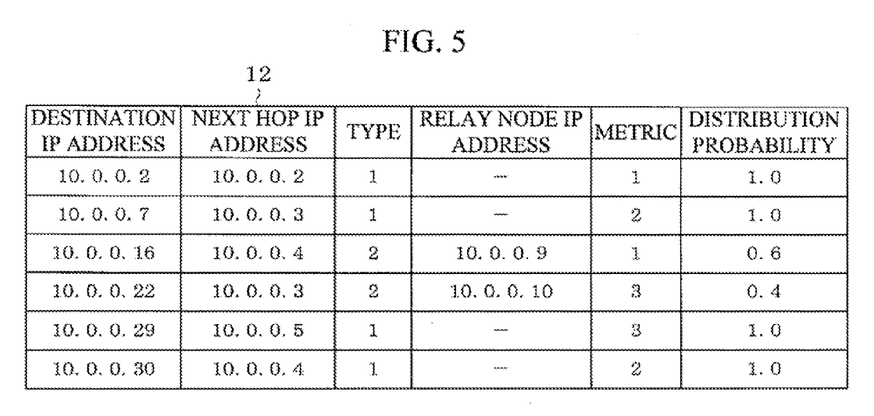
FIG. 5 shows a configuration example of a routing table.

Referring to a configuration example of the routing table 12 shown in FIG. 5, the IP address and metric of the next hop node are registered for each destination node. The metric herein mentioned is defined as the total sum of link costs in a direct path to the destination node. When the link cost of each link is 1, the metric has the same value as the number of hops until the destination node.

Type is also registered in the routing table 12, i.e., type 1 or type 2 is registered. Type 1 indicates that there is a direct path to the destination node, and is the same as an entry registered by the conventional IP routing protocol.

In the topmost entry in the routing table 12, type 1 indicates that in order to reach a node having a destination IP address 10.0.0.2, a bundle need only be forwarded to the next hop node having an IP address 10.0.0.2. Since the destination node is adjacent to the source node in this case, the next hop node is the same as the destination node. The metric until the destination node is 1. In the second topmost entry, type 1 indicates that in order to reach a node having a destination IP address 10.0.0.7, a bundle need only be forwarded to the next hop node having an IP address 10.0.0.3. The metric until the destination node is 2.

On the other hand, type 2 is an entry registered when the source node is not necessarily end-to-end connected to the destination node, and indicating that a bundle can probabilistically reach the destination node. The IP address and distribution probability of a relay node are additionally registered in the path entry of type 2. The relay node IP address is the IP address of a node for which the probability (distribution probability) that a bundle to be forwarded to the destination node can reach it is highest. A relay node is selected from nodes having paths of type 1 from the source node. Also, the metric to the relay node is registered in the path entry of type 2.

The third entry from the top in the routing table 12 shows that for a node having a destination IP address 10.0.0.16, a relay node having an IP address 10.0.0.9 has the highest distribution probability, the metric to the relay node is 1, and the distribution probability of the relay node is 0.6. The third entry also shows that a bundle must be forwarded to an adjacent node having an IP address 10.0.0.4, which is the next hop node as a forward target, in order for the bungle to reach the relay node.

The DTN forward unit 13 has a function of performing DTN forward. More specifically, bundles received from an adjacent node are reconstructed as data, and the data is temporarily stored in the corresponding node. When the next hop as a forward target is found, the data is divided into the bundles, and the bundles are forwarded to the next hop. The next hop as a forward target is determined by referring to the routing table 12. Also, bundles are exchanged via the TCP/IP unit 14.

The TCP/IP unit 14 has a function of exchanging bundles as IP packets with another node, when the DTN forward unit 13 exchanges the bundles. Each bundle is not directly embedded as the payload of an IP packet, but formed into an IP packet as the datagram of a transport protocol such as TCP (Transmission Control Protocol) or UDP (User Datagram Protocol), and exchanged with an adjacent node.

[Operation of First Exemplary Embodiment]

The operation of updating the distribution probability database 11B of the node 1 according to this exemplary embodiment will be explained in detail below with reference to FIG. 6.

First, the distribution probability calculating unit 11C periodically refers to the distribution probability database 11B (step 101), and checks destination IP addresses each having a distribution probability presently registered on the database, thereby checking whether there is a direct path to each destination by referring to the routing table 12 (step 102).

Then, the distribution probability calculating unit 11C checks whether its own node has a presently valid direct path corresponding to the destination node by referring to the routing table 12 (step 103).

If a valid direct path exists (YES in step 103), the distribution probability calculating unit 11C sets the distribution probability corresponding to the destination node at 1.0 (step 104), updates the corresponding entry in the distribution probability database 11B by the new distribution probability (step 107), and terminates the series of distribution probability database updating processes.

On the other hand, if no valid direct path exists (NO in step 103), the distribution probability calculating unit 11C calculates a new distribution probability (step 105). In this step, it is possible to use any algorithm enumerated as an example in the explanation of the distribution probability calculating unit 11C or another algorithm in the calculation of the distribution probability.

Subsequently, the distribution probability calculating unit 11C determines whether the new distribution probability calculated in step 105 is less than a preset threshold value (step 106). If the new distribution probability is less than the threshold value (YES in step 106), the distribution probability calculating unit 11C erases the entry without updating the distribution probability (step 108), and terminates the series of processes.

On the other hand, if the new distribution probability is not less than the threshold value (NO in step 106), the procedure advances to step 107, and the distribution probability calculating unit 11C updates the corresponding entry in the distribution probability database 11B by the new distribution probability (step 107), and terminates the series of distribution probability database updating processes.

Figure 7:
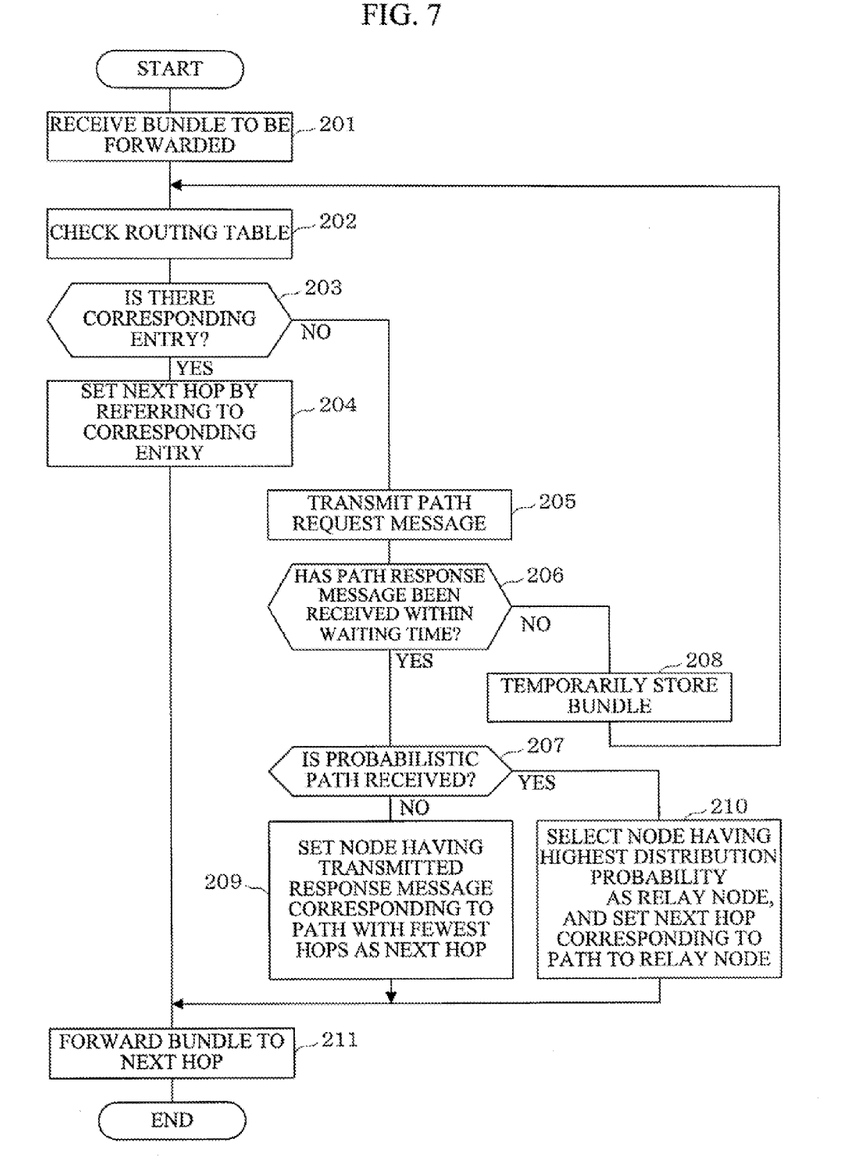
FIG. 7 is a flowchart showing a path solving process of the node according to the first exemplary embodiment of the present invention.

A path solving operation when the node 1 transmits a bundle according to this exemplary embodiment will be explained in detail below with reference to FIG. 7.

First, if the DTN forward unit 13 has received a bundle to be forwarded or if there is a bundle to be transmitted by the node 1 as the source node (step 201), the DTN forward unit 13 searches the routing table 12 for a path entry corresponding to the IP address of the destination node of the bundle (step 202), and determines whether the corresponding entry exists (step 203).

If the corresponding entry exists (YES in step 202), the DTN forward unit 13 solves the IP address of the next hop node registered in the entry, and sets the IP address as the next hop (step 204). After that, the DTN forward unit 13 forwards the bundle to the set next hop (step 211), and terminates the series of path solving processes.

On the other hand, if no corresponding entry exists in step 203 (NO in step 203), the DTN forward unit 13 sends a path request message for solving a path to the destination node, via the path/probability information exchanging unit 11A (step 205).

The path request message is broadcast across the network by flooding. If any of the destination node itself, a node having a direct path to the destination node, and a node having a probabilistic path to the destination node receives the path request message, the path/probability information exchanging unit 11A of the routing protocol unit 11 of the node returns, to the source node (in this case, the node 1), a path response message containing information (e.g., the node is the destination node itself, the presence/absence of a direct path or probabilistic path to the destination node, and the distribution probability) concerning a path from the node to the destination node.

After step 205, the path/probability information exchanging unit 11A waits for a predetermined time until a path response message is received (step 206).

If no path response message is received within the waiting time and time-out occurs (NO in step 206), the bundle is temporarily stored (step 208), and the procedure returns to step 202 in a predetermined time to repetitively execute the processes.

On the other hand, if a path response message is received within the waiting time (YES in step 206), the DTN forward unit 13 determines whether the path response message is returned by a node having a probabilistic path to the destination node or another node (step 207).

If the path response message is not returned by a node having a probabilistic path to the destination node (YES in step 207), the DTN forward unit 13 selects a path response message corresponding to a path that minimizes the number of hops until the destination node contained in the message, and sets, as the next hop, the node having forwarded the path response message to the source node (node 1) (step 209). After that, the procedure advances to step 211 to forward the bundle to the set next hop, and the series of path solving processes are terminated.

On the other hand, if it is determined in step 207 that the path response message is returned by a node having a probabilistic path to the destination node (NO in step 207), the DTN forward unit 13 selects, as a relay node, a node having returned a path response message having the highest distribution probability with respect to the destination node contained in the path response message, and sets, as the next hop, the node having forwarded the path response message to the source node (step 210). After that, the procedure advances to step 211 to forward the bundle to the set next hop, and the series of path solving processes are terminated.

[Effects of First Exemplary Embodiment]

In this exemplary embodiment as described above, the routing protocol unit of each node in a delay tolerant network calculates the distribution probability of the node with respect to the destination node, based on the log of end-to-end paths from the node to the destination node from the past to the present registered in the routing table of the node. Based on the calculated distribution probability of each individual node with respect to the destination node, the DTN forward unit of the source node selects the next hop node to be used to forward forwarding data from the source node to the destination node.

Accordingly, a node that is not directly adjacent to a node of interest but exists beyond a node directly adjacent to the node of interest can be reflected on the probability of distribution from the node of interest. This makes it possible to greatly increase the transport factor with respect to the destination, and implement a highly reliable delay tolerant network.

Also, in this exemplary embodiment, the probability of distribution to the destination node is set at 1.0 when there is a direct path of the MANET routing protocol. Even after the direct path to the destination node has disappeared, the set distribution probability gradually decreases in accordance with the time elapsed from the time of disappearance of the direct path and the number of hops in the path, and is held as a probabilistic path. By thus cooperating with the direct path set by the MANET routing protocol as described above, the distribution probability can be calculated even when the source node is not directly adjacent to the destination node. Therefore, even when the destination node is not directly adjacent to the source node but apart from it by two or more hops, the source node can have the distribution probability with respect to the destination node, and can also forward the distribution probability to a node that is not directly adjacent to the source node.

Furthermore, when forwarding a bundle in this exemplary embodiment, if there is no hit entry on the routing table, the path/probability information exchanging unit of the routing protocol unit can search for a node having the highest distribution probability with respect to the destination node among nodes having direct paths from the source node, by receiving a response message to a path request message of the MANET routing protocol. That is, a node having the probability of distribution to the destination node can be found from among nodes other than nodes adjacent to the source node. Accordingly, even a node other than a node adjacent to a node having a distribution probability can know the distribution probability.

[Second Exemplary Embodiment]

A node according to the second exemplary embodiment of the present invention will be explained below with reference to FIG. 8.

Figure 8:
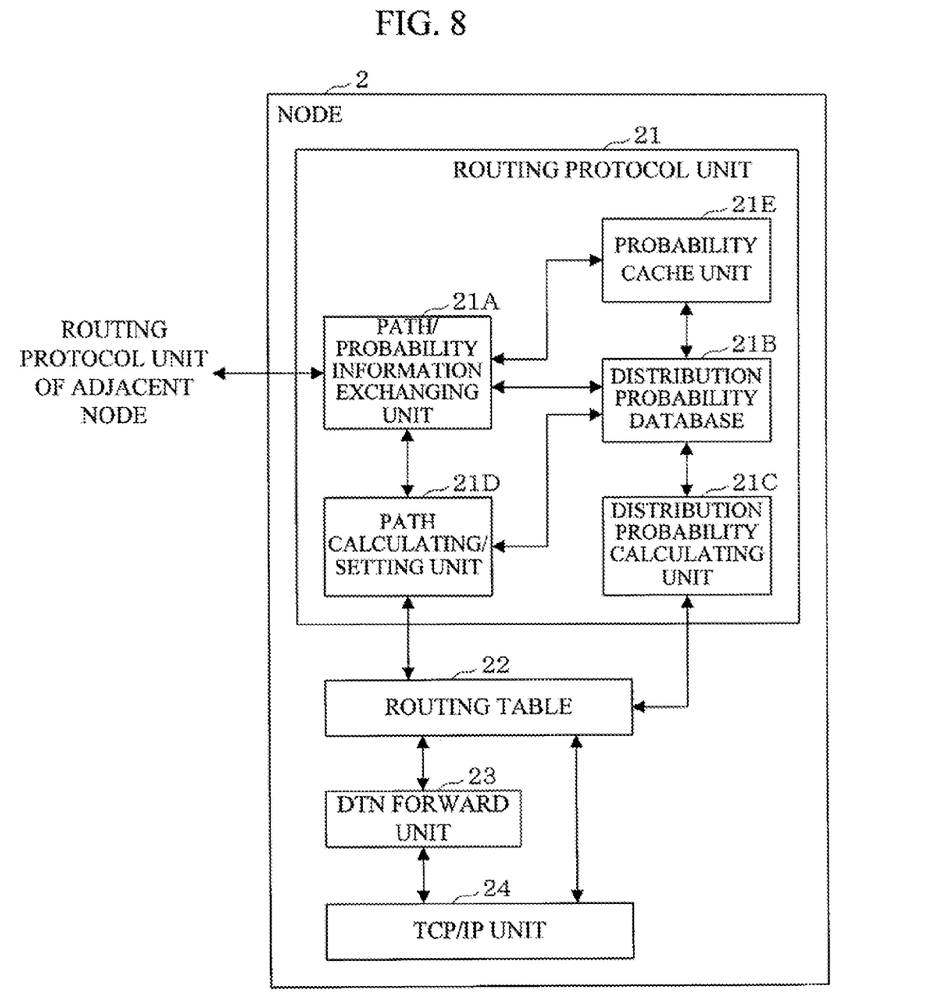
FIG. 8 is a block diagram showing the arrangement of a node according to the second exemplary embodiment of the present invention.

Referring to FIG. 8, a node 2 according to this exemplary embodiment includes a probability cache unit 21E in a routing protocol unit 21, in addition to the arrangement of the node 1 of the first exemplary embodiment. These functional units are implemented by the cooperation of hardware including a CPU, a memory, and various interface circuits of a general information communication terminal and software such as programs and applications.

Note that a path/probability information exchanging unit 21A, path calculating/setting unit 21D, routing table 22, DTN forward unit 23, and TCP/IP unit 24 are respectively equivalent to the path/probability information exchanging unit 11A, path calculating/setting unit 11D, routing table 12, DTN forward unit 13, and TCP/IP unit 14 of the node 1, so a repetitive explanation will be omitted.

The probability cache unit 21E has a function of storing, as a cache, the distribution probability of another node acquired by a path response message via the path/probability information exchanging unit 21A, in a distribution probability database 21B.

The distribution probability database 21B has a function of storing the distribution probability information set as a cache by the probability cache unit 21E, in addition to the function of the distribution probability database 11B of the node 1 in the first exemplary embodiment. Like normally registered distribution probabilities, the cached distribution probability can be returned from the path/probability information exchanging unit 21A in response to a path request message from another node.

Figure 9:
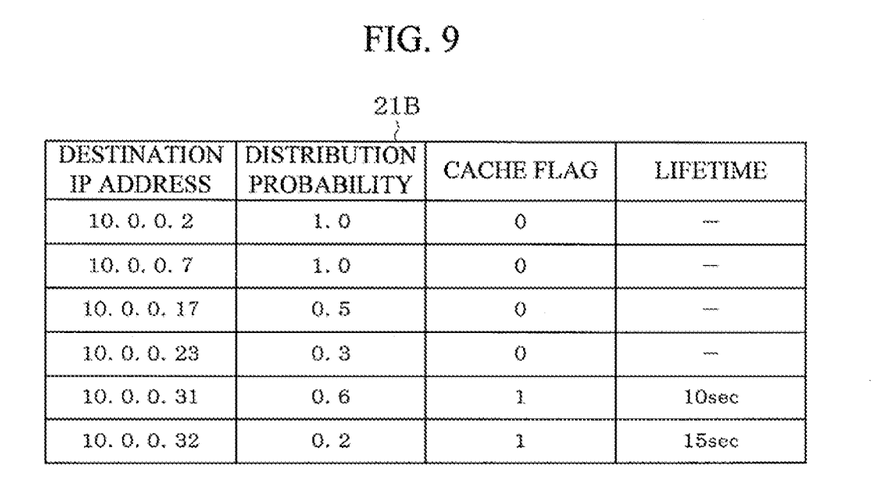
FIG. 9 shows another configuration example of the distribution probability database.

Referring to a configuration example of the distribution probability database 21B shown in FIG. 9, in each distribution probability entry, a cache flag for discriminating whether the entry is the cached distribution probability is set. When the cache flag is 0, the entry is not the cached distribution probability. When the cache flag is 1, the entry is the cached distribution probability. In addition, when the cache flag is 1, a lifetime is set to indicate the remaining effective time of the entry. For example, the distribution probability of a node having a destination IP address 10.0.0.31 is a cached entry, the distribution probability is 0.6, and the lifetime is 10 sec.

A distribution probability calculating unit 21C has a function of updating the distribution probability of an entry in which the cache flag is 1 in the distribution probability database 21B, in addition to the function of the distribution probability calculating unit 11C of the node 1 in the first exemplary embodiment.

More specifically, the lifetime is updated with the elapse of time, and the entry is erased when the lifetime becomes 0 or less. Also, the distribution probability is periodically updated even before the lifetime becomes 0. For example, it is possible to gradually decrease the distribution probability based on the number of hops from a cache source node, or the time elapsed from the cache time.

[Operation of Second Exemplary Embodiment]

Figure 10:
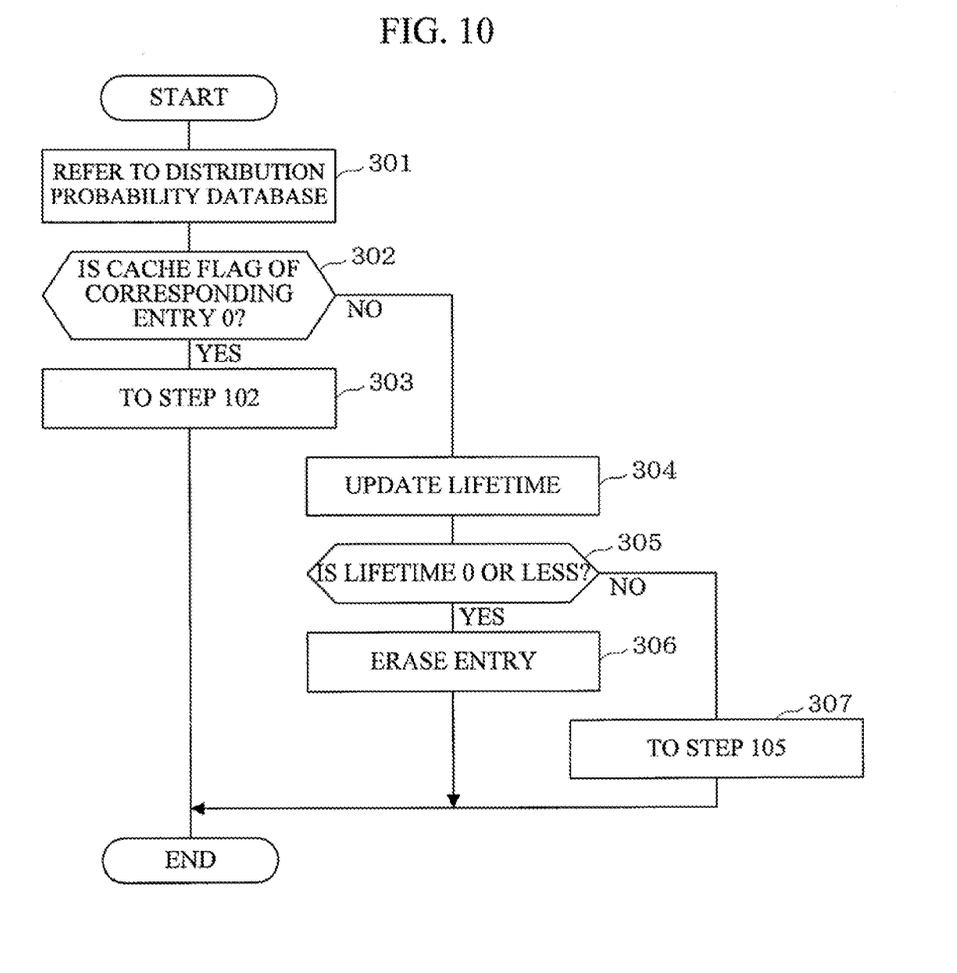
FIG. 10 is a flowchart showing a distribution probability database updating process of the node according to the second exemplary embodiment of the present invention.

The operation of updating the distribution probability database in the node 2 according to this exemplary embodiment will be explained below with reference to FIG. 10.

First, the distribution probability calculating unit 21C periodically refers to the distribution probability database 21B (step 301), and checks whether the cache flag of each entry registered on the database is 0 (step 302).

Figure 6:
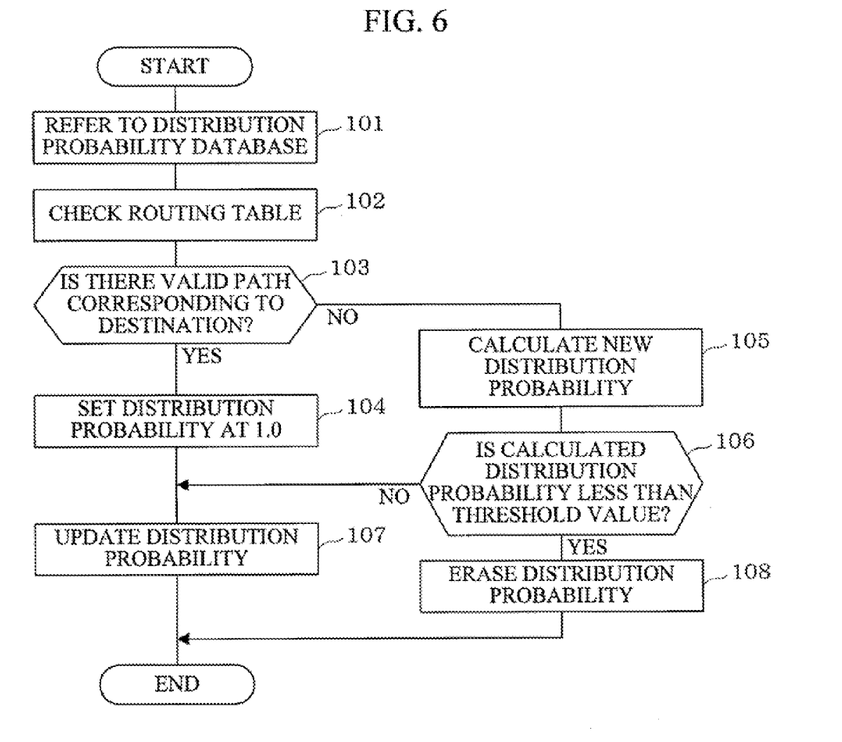
FIG. 6 is a flowchart showing a distribution probability database updating process of the node according to the first exemplary embodiment of the present invention.

If the cache flag is 0 (YES in step 302), the distribution probability calculating unit 21C executes the process from step 102 of FIG. 6 described previously (step 303), and terminates the series of distribution probability database updating processes.

On the other hand, if the cache flag is 1 (NO in step 302), the distribution probability calculating unit 21C updates the lifetime of the entry based on the time elapsed from the last updating time (step 304).

Then, the distribution probability calculating unit 21C checks whether the lifetime is 0 or less based on the result in step 304 (step 305).

If the lifetime is 0 or less (YES in step 305), the distribution probability calculating unit 21C erases the entry by regarding it as an invalid entry (step 306), and terminates the series of the distribution probability database updating processes.

On the other hand, if the lifetime is larger than 0, the distribution probability calculating unit 21C executes the process from step 105 of FIG. 6 described previously, and terminates the series of the distribution probability database updating processes.

[Effects of Second Exemplary Embodiment]

In this exemplary embodiment as described above, the probability cache unit stores; as a cache, the distribution probability of another node acquired by a path response message via the path/probability information exchanging unit, in the distribution probability database. Like normally registered distribution probabilities, the cached distribution probability can be notified in response to a path request message from another node. This makes it possible to reduce the transmission amount of path request messages, and shorten the time required for a node that transmits a path request message to find a node having the probability of distribution to the destination node.

INDUSTRIAL APPLICABILITY

In the routing method and node according to the present invention, forwarding data is temporarily stored in an intermediate node. This makes the present invention suitable for a routing technique in a delay tolerant network capable of distribution without any end-to-end reachability from the source node to the destination node. The present invention is particularly optimum for a network in which the node-to-node connection is unstable and unreliable, such as a wireless ad-hoc network or satellite network.

The invention claimed is:

1. A routing method for use in a delay tolerant network (DTN) capable of distributing forwarding data by temporarily storing the forwarding data in an intermediate node even if there is no end-to-end reachability from a source node to a destination node, the routing method comprising:
   a routing protocol step, executed on a processor, of causing each node of the delay tolerant network to calculate a distribution probability of the each node with respect to the destination node based on a log of end-to-end paths from the each node to the destination node from the past to the present registered in a routing table of the each node; and
   a DTN forward step of causing the source node to select a next hop node to be used to forward the forwarding data from the source node to the destination node, based on the calculated distribution probability of the each node with respect to the destination node.

2. A routing method according to claim 1, wherein the routing protocol step further comprises the step of, when an end-to-end path from the each node to the destination node does not exist at present but exists in the past, gradually decreasing the distribution probability in accordance with a time elapsed from a time of disappearance of the past end-to-end path.

3. A routing method according to claim 1, wherein the routing protocol step further comprises the step of setting the distribution probability at 1.0 if an end-to-end path to the destination node presently exists.

4. A routing method according to claim 1, wherein the routing protocol step further comprises the step of erasing the distribution probability if the distribution probability is not more than a preset threshold value.

5. A routing method according to claim 1, wherein the DTN forward step further comprises the step of, when a forward node is selecting a next hop node to which the forwarding data addressed to the destination node is to be forwarded, broadcasting a path request message from the forward node across the delay tolerant network, and selecting the next hop node to be used to forward the forwarding data from the forward node to the destination node, based on the distribution probability of the each node with respect to the destination node notified by a path response message returned from the each node in response to the path request message.

6. A node for use in a delay tolerant network (DTN), the DTN capable of distributing forwarding data by temporarily storing the forwarding data in an intermediate node even if there is no end-to-end reachability from a source node to a destination node, the node comprising:
   a routing protocol unit which calculates a distribution probability of the node with respect to the destination node based on a log of end-to-end paths from the node to the destination node from the past to the present registered in a routing table of the node; and
   a DTN forward unit which, when the node is the source node, selects a next hop node to be used to forward the forwarding data from the source node to the destination node, based on calculated distribution probabilities of each respective node included in the DTN with respect to the destination node.

7. A node according to claim 6, wherein when an end-to-end path from the node to the destination node does not exist at present but exists in the past, said routing protocol unit gradually decreases the distribution probability in accordance with a time elapsed from a time of disappearance of the past end-to-end path.

8. A node according to claim 7, wherein said routing protocol unit gradually decreases the distribution probability in accordance with one of the number of hops and a metric of the past end-to-end path.

9. A node according to claim 6, wherein said routing protocol unit sets the distribution probability at 1.0 if the end-to-end path to the destination node presently exists.

10. A node according to claim 6, wherein said routing protocol unit erases the distribution probability if the distribution probability is not more than a preset threshold value.

11. A node according to claim 6, wherein when selecting a next hop node to which the forwarding data addressed to the destination node is to be forwarded while the node is an arbitrary forward node in the DTN, said DTN forward unit broadcasts a path request message from the forward node across the delay tolerant network, and selects the next hop node to be used to forward the forwarding data from the forward node to the destination node, based on the distribution probabilities of each respective node included in the DTN with respect to the destination node notified by a path response message returned from the each respective node in response to the path request message.

12. A node according to claim 11, wherein said DTN forward unit selects, as the next hop node, a node having a highest distribution probability among the distribution probabilities notified by the path response messages.

13. A node according to claim 12, wherein said routing protocol unit stores, as a cache, the distribution probabilities of each respective node included in the DTN with respect to the destination node notified by the path response message, and, in response to a path request message received from another node, returns, to the other node, a path response message containing the distribution probabilities of each respective node included in the DTN with respect to the destination node stored as the cache.

14. A node according to claim 13, wherein said routing protocol unit sets a lifetime for the distribution probabilities of each respective node included in the DTN with respect to the destination node stored as the cache, and erases the distribution probabilities if the lifetime is not more than 0.

15. A node according to claim 13, wherein said routing protocol unit gradually decreases the distribution probabilities of each respective node included in the DTN with respect to the destination node stored as the cache, in accordance with at least one of the number of hops from a cache source node and a time elapsed from a caching time.

16. A node for use in a delay tolerant network (DTN), the DTN capable of distributing forwarding data by temporarily storing the forwarding data in an intermediate node even if there is no end-to-end reachability from a source node to a destination node, the node comprising:
   a routing protocol unit which calculates a distribution probability of the node with respect to the destination node based on a log of end-to-end paths from the node to the destination node from the past to the present registered in a routing table of the node; and
   a DTN forward unit which, when the node is selecting a next hop node to which the forwarding data addressed to the destination node is to be forwarded, broadcasts a path request message across the DTN, and selects the next hop node to be used to forward the forwarding data from the node to the destination node, based on distribution probabilities of each respective node included in the DTN with respect to the destination node notified by a path response message returned from the each respective node in response to the path request message.

17. A node according to claim 16, wherein said DTN forward unit selects, as the next hop node, a node having a highest distribution probability among the distribution probabilities notified by the path response messages.

18. A node according to claim 17, wherein said routing protocol unit stores, as a cache, the distribution probabilities of each respective node included in the DTN with respect to the destination node notified by the path response message, and, in response to a path request message received from another node, returns, to the other node, a path response message containing the distribution probabilities of each respective node included in the DTN with respect to the destination node stored as the cache.

19. A node according to claim 18, wherein said routing protocol unit sets a lifetime for the distribution probabilities of each respective node included in the DTN with respect to the destination node stored as the cache, and erases the distribution probabilities if the lifetime is not more than 0.

20. A node according to claim 18, wherein said routing protocol unit gradually decreases the distribution probabilities of each respective node included in the DTN with respect to the destination node stored as the cache, in accordance with at least one of the number of hops from a cache source node and a time elapsed from a caching time.

21. The node according to claim 16, wherein the routing protocol unit comprises:
   a path/probability information exchanging unit which (i) exchanges node information, link information, and distribution probability information with an adjacent node, (ii) generates a routing entry based on the exchanged node information, link information, and distribution probability information; and (iii) update the routing table based on the generated routing entry; and
   a distribution probability database stores information related to the distribution probabilities of the each respective node included in the DTN with respect to the destination node.

22. The node according to claim 6, wherein the routing protocol unit comprises:
   a path/probability information exchanging unit which (i) exchanges node information, link information, and distribution probability information with an adjacent node, (ii) generates a routing entry based on the exchanged node information, link information, and distribution probability information; and (iii) update the routing table based on the generated routing entry; and
   a distribution probability database stores information related to the distribution probabilities of the each respective node included in the DTN with respect to the destination node.

* * * * *